(12) United States Patent
Li et al.

(10) Patent No.: US 10,650,801 B2
(45) Date of Patent: May 12, 2020

(54) LANGUAGE RECOGNITION METHOD, APPARATUS AND DEVICE AND COMPUTER STORAGE MEDIUM

(71) Applicant: BAIDU ONLINE NETWORK TECHNOLOGY (BEIJING) CO., LTD., Haidian District Beijing (CN)

(72) Inventors: Xiao Li, Beijing (CN); Chao Li, Beijing (CN); Yong Guan, Beijing (CN)

(73) Assignee: Baidu Online Network Technology (Beijing) Co., Ltd., Beijing (CN)

(*) Notice: Subject to any disclaimer, the term of this patent is extended or adjusted under 35 U.S.C. 154(b) by 175 days.

(21) Appl. No.: 15/774,807

(22) PCT Filed: Jun. 20, 2016

(86) PCT No.: PCT/CN2016/086357
§ 371 (c)(1),
(2) Date: May 9, 2018

(87) PCT Pub. No.: WO2017/084334
PCT Pub. Date: May 26, 2017

(65) Prior Publication Data
US 2018/0336883 A1    Nov. 22, 2018

(30) Foreign Application Priority Data

Nov. 17, 2015 (CN) .......................... 2015 1 0792176

(51) Int. Cl.
*G10L 15/00* (2013.01)
*G10L 15/02* (2006.01)
(Continued)

(52) U.S. Cl.
CPC ............. *G10L 15/005* (2013.01); *G10L 15/02* (2013.01); *G10L 15/14* (2013.01); *G10L 15/22* (2013.01)

(58) Field of Classification Search
CPC ...................................................... G10L 15/005
See application file for complete search history.

(56) References Cited

U.S. PATENT DOCUMENTS 5,689,616 A    11/1997  Li
5,995,928 A    11/1999  Nguyen et al.
(Continued)

FOREIGN PATENT DOCUMENTS

CN    1892818      1/2007
CN    103853703    6/2014
(Continued)

OTHER PUBLICATIONS

International Search Report for PCT/CN2016/086357, English Translation attached to original, Completed by the Patent Office on Aug. 30, 2016, All together 8 Pages.
(Continued)

*Primary Examiner* — Matthew H Baker
(74) *Attorney, Agent, or Firm* — Brooks Kushman PC

(57) ABSTRACT

Embodiments of the present disclosure provide a language recognition method and apparatus, a device and a computer storage medium. In an aspect, in the embodiments of the present disclosure, after the Nth speech segment included by the speech signal is received, language recognition is performed according to already-received previous N speech segments to obtain the score of each language in at least one language, N being 2, 3, 4 . . . ; therefore, if there exists a langue whose score reaches the designated threshold, the language whose score reaches the designated threshold is considered as the language matched with the speech signal.

(Continued)

After receiving the N$^{th}$ speech segment included by a speech signal, perform language recognition according to previous N speech segments that have already been received, to obtain a score of each language in at least one language, N being an integer larger than or equal to 2    ⤳ S201

If there exists a language whose score reaches a designated threshold, consider the language whose score reaches the designated threshold as a language matched with the speech signal    ⤳ S202

Therefore, the technical solutions according to embodiments of the present disclosure solve the problem in the prior art that the efficiency of language recognition is lower so that the language recognition cannot be applied to an application scenario in which the recognition result needs to be obtained quickly.

21 Claims, 3 Drawing Sheets

(51) Int. Cl.
 *G10L 15/14* (2006.01)
 *G10L 15/22* (2006.01)

(56) References Cited

U.S. PATENT DOCUMENTS

| | | | | |
|---|---|---|---|---|
| 8,543,395 | B2* | 9/2013 | Todic | G10L 15/05 |
| | | | | 704/10 |
| 9,129,591 | B2* | 9/2015 | Sung | G10L 15/32 |
| 2005/0187758 | A1* | 8/2005 | Khasin | G10L 15/005 |
| | | | | 704/10 |
| 2007/0005358 | A1 | 1/2007 | Heidenreich et al. | |
| 2010/0106499 | A1* | 4/2010 | Lubowich | G10L 15/005 |
| | | | | 704/235 |
| 2014/0163984 | A1 | 6/2014 | Dai et al. | |

FOREIGN PATENT DOCUMENTS

| | | |
|---|---|---|
| CN | 103871401 | 6/2014 |
| CN | 105336324 | 2/2016 |
| WO | 0118793 | 3/2001 |

OTHER PUBLICATIONS

Liang, Chunyan et al. Computer Engineering and Applications Dec. 31, 2013, vol. 49, No. 2, pp. 174-176, "GSV-SVM based language recognition system".

Chinese Search Report dated Mar. 11, 2020 for related Chinese Patent Application No. 201510792176.X; 1 pg.

* cited by examiner

LANGUAGE RECOGNITION METHOD, APPARATUS AND DEVICE AND COMPUTER STORAGE MEDIUM

CROSS-REFERENCE TO RELATED APPLICATION

This application is the U.S. national phase of PCT Application No. PCT/CN2016/086357 filed on Jun. 10, 2016, which claims priority to CN Patent Application No. 201510792176.X filed on Nov. 17, 2015, the disclosures of which are incorporated in their entirety by reference herein.

FIELD OF THE DISCLOSURE

The present disclosure relates to the technical field of speech recognition, and particularly to a language recognition method and apparatus, a device and a computer storage medium.

BACKGROUND OF THE DISCLOSURE

Speech recognition techniques appear along with constant development of Internet application and information technology. At present, speech recognition techniques have already been extensively applied to many fields such as household electrical appliances, industry and medical care and provided great convenience to a user's life.

In the prior art, language recognition needs to be performed before speech recognition to recognize which language is employed by an input speech signal, and then use a decoder corresponding to this language to perform further speech recognition for the speech signal.

However, in the prior art, a client divides a user-input speech signal into several speech segments, and sends the speech segments in turn to a server for language recognition. After receiving all speech segments belonging to the same speech signal, the server begins to perform the language recognition. As a result, the language recognition efficiency in the prior art is lower so that the language recognition cannot be applied to an application scenario that needs to quickly obtain a recognition result.

SUMMARY OF THE DISCLOSURE

In view of the above, embodiments of the present disclosure provide a language recognition method and apparatus, a device and a computer storage medium, which solve the problem in the prior art that the efficiency of language recognition is lower so that the language recognition cannot be applied to an application scenario in which a recognition result needs to be obtained quickly.

According to an aspect of embodiments of the present disclosure, there is provided a language recognition method, comprising:

after receiving the $N^{th}$ speech segment included by a speech signal, performing language recognition according to previous N speech segments that have already been received, to obtain a score of each language in at least one language, N being 2, 3, 4, . . . ;

if there exists a language whose score reaches a designated threshold, considering the language whose score reaches the designated threshold as a language matched with the speech signal.

The above aspect and any possible implementation mode further provide an implementation mode: the method further comprises:

if there does not exist the language whose score reaches the designated threshold, after receiving the $N+1^{th}$ speech segment, continuing to perform language recognition according to the already-received $N+1^{th}$ speech segment, until a language matched with the speech signal is obtained.

The above aspect and any possible implementation mode further provide an implementation mode: the performing language recognition according to previous N speech segments that have already been received, to obtain the score of each language in at least one language comprises:

extracting a speech feature from the $N^{th}$ speech segment;

obtaining a statistics of the $N^{th}$ speech segment according to the speech feature;

obtaining a second accumulated statistics according to the statistics of the $N^{th}$ speech segment and a first accumulated statistics of the previous N−1 speech segments;

using a language recognition model to perform language recognition for the second accumulated statistics to obtain the score of each language in at least one language.

The above aspect and any possible implementation mode further provide an implementation mode: before extracting a speech feature from the $N^{th}$ speech segment, the method further comprises: performing mute detection for the $N^{th}$ speech segment to remove a mute signal from the $N^{th}$ speech segment.

The above aspect and any possible implementation mode further provide an implementation mode: the second accumulated statistics comprises: weights of the speech features of previous N speech segments, an average value of speech features of the previous N speech segments, and a variance of the speech features of the previous N speech segments.

The above aspect and any possible implementation mode further provide an implementation mode: the language recognition model comprises a judgment model and a background model; the using the language recognition model to perform language recognition for the second accumulated statistics to obtain the score of each language in at least one language comprises:

using the background model to convert the second accumulated statistics into a corresponding Gaussian hyper vector;

calculating a space distance between a vector in the judgment model and the Gaussian hyper vector as a score of the language corresponding to the judgment model.

The above aspect and any possible implementation mode further provide an implementation mode: the method further comprises:

if there still does not exist a language whose score reaches the designated threshold after all speech segments included by the speech signal are received, considering a language with the highest score as the language matched with the speech signal.

The above aspect and any possible implementation mode further provide an implementation mode: the method further comprises: considering the language matched with the speech signal as a language recognition result, and output the language recognition result.

According to another aspect of embodiments of the present disclosure, there is provided a language recognition apparatus, comprising:

a recognition module configured to, after receiving the $N^{th}$ speech segment included by a speech signal, perform language recognition according to previous N speech segments that have already been received, to obtain a score of each language in at least one language, N being 2, 3, 4, . . . ;

a judgment module configured to, if there exists a language whose score reaches a designated threshold, consider the language whose score reaches the designated threshold as a language matched with the speech signal.

The above aspect and any possible implementation mode further provide an implementation mode:

the recognition module is further configured to:

if there does not exist the language whose score reaches the designated threshold, after receiving the $N+1^{th}$ speech segment, continue to perform language recognition according to the already-received $N+1^{th}$ speech segment, until a language matched with the speech signal is obtained.

The above aspect and any possible implementation mode further provide an implementation mode: the recognition module is specifically configured to:

extract a speech feature from the $N^{th}$ speech segment;

obtain a statistics of the $N^{th}$ speech segment according to the speech feature;

obtain a second accumulated statistics according to the statistics of the $N^{th}$ speech segment and a first accumulated statistics of the previous $N-1$ speech segments;

use a language recognition model to perform language recognition for the second accumulated statistics to obtain a score of each language in at least one language.

The above aspect and any possible implementation mode further provide an implementation mode: the recognition module is further configured to:

perform mute detection for the $N^{th}$ speech segment to remove a mute signal from the $N^{th}$ speech segment.

The above aspect and any possible implementation mode further provide an implementation mode: the second accumulated statistics comprises: weights of the speech features of previous N speech segments, an average value of speech features of the previous N speech segments, and a variance of the speech features of the previous N speech segments.

The above aspect and any possible implementation mode further provide an implementation mode: the language recognition model comprises a judgment model and a background model; the recognition module, upon using the language recognition model to perform language recognition for the second accumulated statistics to obtain a score of each language in at least one language, is specifically configured to:

use the background model to convert the second accumulated statistics into a corresponding Gaussian hyper vector;

calculate a space distance between a vector in the judgment model and the Gaussian hyper vector as a score of the language corresponding to the judgment model.

The above aspect and any possible implementation mode further provide an implementation mode: the judgment module is further configured to:

if there still does not exist a language whose score reaches the designated threshold after all speech segments included by the speech signal are received, consider a language with the highest score as the language matched with the speech signal.

The above aspect and any possible implementation mode further provide an implementation mode: the apparatus further comprises:

an output module configured to consider the language matched with the speech signal as a language recognition result, and output the language recognition result.

As can be seen from the above technical solutions, embodiments of the present disclosure have the following advantageous effects:

In the technical solution according to an embodiment of the present disclosure, language recognition can be performed once a speech segment is received, so that language recognition may be completed before all speech segments have been received. As compared with the method of beginning to perform language recognition after all speech segments must be received in the prior art, the embodiments of the present disclosure solve the problem in the prior art that the efficiency of language recognition is lower so that the language recognition cannot be applied to an application scenario in which the recognition result needs to be obtained quickly, and substantially improve the language recognition efficiency so that the language recognition can be applied to the application scenario in which the recognition result needs to be obtained quickly.

DETAILED DESCRIPTION OF PREFERRED EMBODIMENTS

The present disclosure will be described in detail in conjunction with figures and specific embodiments to make objectives, technical solutions and advantages of the present disclosure more apparent.

It should be appreciated that embodiments described here are only partial embodiments of the present disclosure, not all embodiments. Based on embodiments in the present disclosure, all other embodiments obtained by those having ordinary skill in the art without making inventive efforts all fall within the protection scope of the present disclosure.

Terms used in embodiments of the present disclosure are only intended to describe specific embodiments, not to limit the present disclosure. Singular forms "a", "said" and "the" used in embodiments and claims of the present disclosure are also intended to include plural forms, unless other senses are clearly defined in the context.

It should be appreciated that the term "and/or" used in the text is only an association relationship depicting associated objects and represents that three relations might exist, for example, A and/or B may represents three cases, namely, A exists individually, both A and B coexist, and B exists individually. In addition, the symbol "/" in the text generally indicates associated objects before and after the symbol are in an "or" relationship.

It should be appreciated that although terms such as "first" and "second" might be used in the embodiments of the present disclosure to describe accumulated statistics, these accumulated statistics should not be limited to these terms. These terms are only used to distinguish the accumulated statistics from one another. For example, without departing from the scope of embodiments of the present disclosure, a first accumulated statistics may also be called as a second accumulated statistics, and similarly, the second accumulated statistics may also be called as the first accumulated statistics.

Depending on the context, the word "if" as used herein may be construed as "at the time when . . . " or "when . . .

" or "responsive to determining" or "responsive to detecting". Similarly, depending on the context, phrases "if . . . is determined" or "if . . . (stated condition or event) is detected" may be construed as "when . . . is determined" or "responsive to determining" or "when . . . (stated condition or event) is detected" or "responsive to detecting (stated condition or event)".

Figure 1:
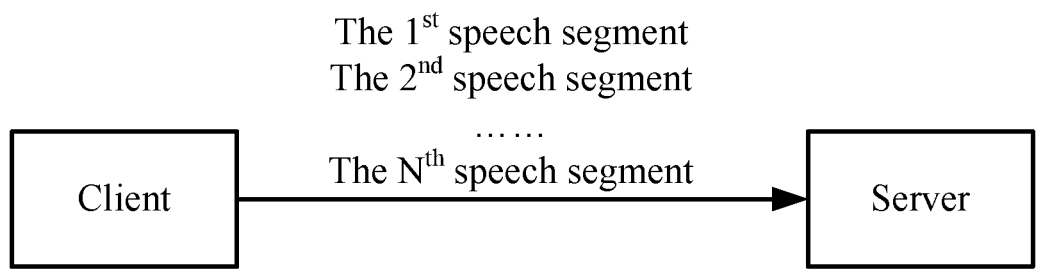
FIG. 1 is an exemplary diagram of a system used in a technical solution according to an embodiment of the present disclosure.

A system used by the technical solution according to an embodiment of the present disclosure is as shown in FIG. 1 and mainly comprises a client and a server. A method and apparatus according to embodiments of the present disclosure are implemented on a server side, and mainly used to receive a speech signal sent by the client, then perform language recognition, and finally output a recognition result. The function of the client is not changed in embodiments of the present disclosure.

Figure 2:
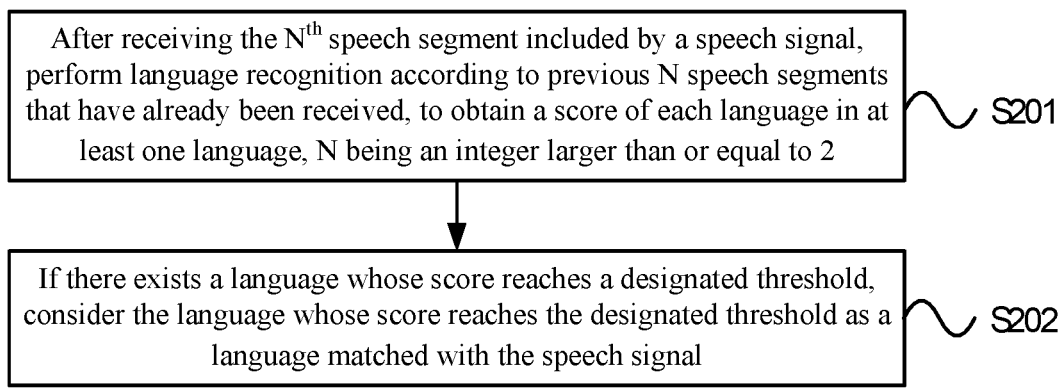
FIG. 2 is a flow chart of a language recognition method according to an embodiment of the present disclosure.

An embodiment of the present disclosure provides a language recognition method. Referring to FIG. 2 which is a flow chart of a language recognition method according to an embodiment of the present disclosure, the method comprises the followings steps:

S201: after receiving the $N^{th}$ speech segment included by a speech signal, performing language recognition according to previous N speech segments that have already been received, to obtain a score of each language in at least one language, N being an integer larger than or equal to 2.

S202: if there exists a language whose score reaches a designated threshold, considering the language whose score reaches the designated threshold as a language matched with the speech signal.

Figure 3:
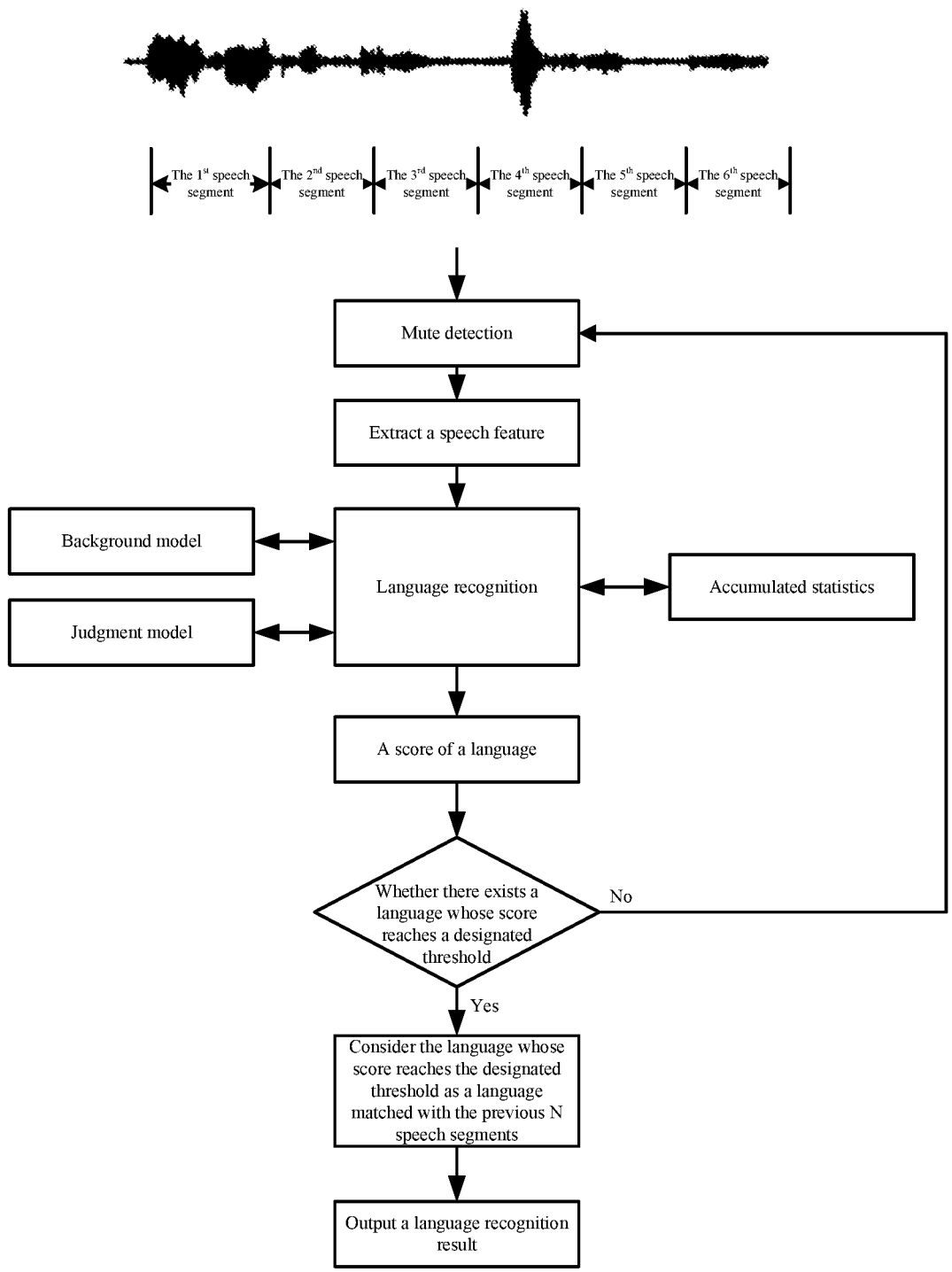
FIG. 3 is a flow chart of a language recognition method according to a preferred embodiment of the present disclosure.

Reference is made to FIG. 3 which is a flow chart of a language recognition method according to a preferred embodiment of the present disclosure. As shown in the figure, in an online practical scenario, the client may receive the user-input speech signal, then divide the speech signal into several speech segments, and then send the speech segments in turn to the server. This means that the server does not receive the user's speech signal in one time, but receives the speech signal portion by portion and receives the speech segments in turn. When the user has not yet finished speaking a sentence, in fact a portion of speech segments have already been sent to the server. As such, the server may receive the speech segments sent by the client, wherein the client sends several speech segments to the server in an order, and the sever only receives one speech segment each time.

It may be appreciated that lengths of speech segments included by a speech signal may be equal or not equal. For example, the length of the first speech segment is 500 ms, and the length of each speech segment thereafter is 250 ms.

In the embodiment of the present disclosure, after receiving the $N^{th}$ speech segment included by a speech signal, the server performs language recognition according to previous N speech segments that have already been received, to obtain a score of each language in at least one language.

Furthermore, if there exists a language whose score reaches a designated threshold, the language whose score reaches the designated threshold is considered as a language matched with the speech signal. Here, since the server obtains the language matched with the speech signal, the server stops performs language recognition, i.e., even though the server further receives the $N+1^{th}$ speech segment, the server does not continue to perform language recognition according to previous N+1 speech segments.

Conversely, if there does not exist a language whose score reaches a designated threshold, after the server receives the $N+1^{th}$ speech segment, the server continues to perform language recognition according to the already-received previous N+1 speech segments, until a language matched with the speech signal is obtained.

If there still does not exist a language whose score reaches a designated threshold after all speech segments included by the speech signal are received by the server, the server considers a language with the highest score as the language matched with the speech signal.

In the embodiment of the present disclosure, N is an integer larger than or equal to 2, and N is 2, 3, 4, . . . . That is to say, beginning with the received second speech segment, the server performs language recognition once according to already-received all speech segments once the server receives a speech segment, until a language whose score reaches the designated threshold is obtained.

For example, in the embodiment of the present disclosure, a method of the server performing language recognition according to already-received previous N speech segments to obtain a score of each language in at least one language may include but not limited to:

As shown in FIG. 3, first, mute detection is performed for the $N^{th}$ speech segment to remove a mute signal in the $N^{th}$ speech segment. Then, a speech feature is extracted from the $N^{th}$ speech segment. Then, a statistics of the $N^{th}$ speech segment is obtained according to the speech feature. Then, a second accumulated statistics is obtained according to the statistics of the $N^{th}$ speech segment and a first accumulated statistics of the previous N−1 speech segments. Finally, a language recognition model is used to perform language recognition for the second accumulated statistics to obtain a score of each language in at least one language.

During practical application, when the user inputs the speech signal to the client, the client usually collects a mute signal of a certain time length before the user begins to speak. Therefore, after receiving a speech segment, for example, the $N^{th}$ speech segment, the server needs to first perform mute detection for the $N^{th}$ speech segment, to determine a location of the mute signal in the $N^{th}$ speech segment, and then remove the mute signal of the $N^{th}$ speech segment from the speech segment according to the location, thereby avoiding interference caused by existence of the mute signal to the language recognition. In addition, it is further possible to remove a noise signal from the speech segment while performing mute detection to further reduce interference to the language recognition.

In a specific implementation procedure, after mute detection is performed for the $N^{th}$ speech segment, a speech feature of the $N^{th}$ speech segment is extracted from the $N^{th}$ speech segment obtained after the mute detection. The speech feature of the $N^{th}$ speech segment may include but is not limited to: Perceptual Linear Predictive (PLP) coefficient and Mel Frequency Cepstrum Coefficient (MPCC).

As shown in FIG. 3, in the embodiment of the present disclosure, once receiving a speech segment, the server obtains statistics of the speech segment, then accumulates the statistics of the speech segment with accumulated statistics of all previously-received speech segments to obtain new accumulated statistics. That is to say, the statistics of the speech segment is accumulated on the original accumulated statistics, instead of re-performing accumulation of statistics of all received speech segments.

As shown in FIG. 3, based on the above depictions, after receiving the $N^{th}$ speech segment, the server adds up the statistics of the $N^{th}$ speech segment with the first accumulated statistics of the previous N−1 speech segments to obtain the second accumulated statistics, to achieve accumulation of the statistics of the $N^{th}$ speech segment into the second accumulated statistics. It may be appreciated that the second accumulated statistics represents language features of the speech signal so far.

In the embodiment of the present disclosure, the statistics of the $N^{th}$ speech segment comprises a weight of the $N^{th}$ speech segment.

The first accumulated statistics comprises: weights of the speech features of previous N−1 speech segments, an average value of speech features of the previous N−1 speech segments, and a variance of the speech features of the previous N−1 speech segments.

Correspondingly, the second accumulated statistics comprises: weights of the speech features of previous N speech segments, an average value of speech features of the previous N speech segments, and a variance of the speech features of the previous N speech segments.

As may be appreciated, to enable accumulation of statistics of speech segments, it is feasible to, once statistics are accumulated, store the obtained new accumulated statistics in a memory of the server, and not to perform zero cleaning of the accumulated statistics before a reset signal is received. Therefore, the first accumulated statistics of the previous N−1 speech segments may be obtained from the memory of the server.

For example, the weight of the $N^{th}$ speech segment is obtained by using the following formula:

$$n_t = Pr(i|x_t)$$

Where $n_t$ represents the weight of the $N^{th}$ speech segment, $x_t$ represents a speech segment at time t, and $Pr(i|x_t)$ represents a probability of $x_t$ falling on the $i^{th}$ cluster in a background model.

Likewise, for example, the following formula is used to obtain weights of speech features of previous N speech segments:

$$n_i = \sum_{t=1}^{T} Pr(i|x_t)$$

The following formula is used to obtain the average value of speech features of the previous N speech segments:

$$E_i(x) = \frac{1}{n_i} \sum_{t=1}^{T} Pr(i|x_t)x_t$$

The following formula is obtained to obtain the variance of speech features of the previous N speech segments:

$$E_i(x^2) = \frac{1}{n_i} \sum_{t=1}^{T} Pr(i|x_t)x_t^2$$

In the above formula, $n_i$ represents weights of speech features of previous N speech segments; T represents a total time length of the speech signal; $E_i(x)$ represents an average value of speech features of previous N speech segments; $E_i(x^2)$ represents a variance of speech features of previous N speech segments.

For example, the method of using a language recognition model to perform language recognition for the second accumulated statistics to obtain a score of each language in at least one language may include but is not limited to:

As shown in FIG. 3, in the embodiment of the present disclosure, the language recognition model may include but is not limited to a judgment model and a background model, wherein the judgment model may be implemented by using a Gaussian Hyper Vector Model, a Deep Neural Network Model or a Space Vector Model. The number of the judgment modes may be at least two, for example, a judgment model corresponding to English language, a judgment model corresponding to Chinese language and a judgment model corresponding to French language. Each of the judgment models may comprise a vector of the corresponding language. The background model is a high-order Gaussian hybrid model obtained by using many different languages, different channels and speech signals of users of different genders to train.

First, the background model may be used to convert the second accumulated statistics into a corresponding Gaussian hyper vector. Then, a space distance between the vector in the judgment model and the Gaussian hyper vector is calculated as a score of the language corresponding to the judgment model.

It may be appreciated that each judgment model in at least two judgment models may be used to respectively score the second accumulated statistics to obtain the score of the language corresponding to each judgment model. For example, the judgment model corresponding to English language is used to score to obtain the score of English language as the language corresponding to the previous N speech segments; the judgment model corresponding to Chinese language is used to score to obtain the score of Chinese language as the language corresponding to the previous N speech segments; the judgment model corresponding to French language is used to score to obtain the score of French language as the language corresponding to the previous N speech segments.

Furthermore, the score of each language in at least one language is compared with the designated threshold of the language. If there exists the language whose score reaches the designated threshold of the corresponding language, the language whose score reaches the designated threshold of the corresponding language is considered as a language matched with the previous N speech segments, and language recognition is stopped. Even though the server receives the $N+1^{th}$ speech segment, the server does not perform the above language recognition for it. Therefore, the language matched with the speech signal has already been recognized.

Conversely, if there does not exist a language whose score reaches a designated threshold of the corresponding language, i.e., all scores do not reach the designated threshold of the corresponding language, the above operation continues to be performed for next received speech segment, namely, the $N+1^{th}$ speech segment, to obtain the score of each language again according to the previous N+1 speech segments, until the above language recognition procedure is stopped when there exists a language whose score reaches the designated threshold of the corresponding language.

For example, if the score of English language as the language corresponding to the previous N speech segments reaches the designated threshold of English language, English language is considered as the language matched with the previous N speech segments. Alternatively, for another example, if the score of Chinese language as the language corresponding to the previous N speech segments reaches the designated threshold of Chinese language, Chinese language is considered as the language matched with the previous N speech segments. Alternatively, for further example, if the score of French language as the language corresponding to the previous N speech segments reaches the designated threshold of French language, French language is considered as the language matched with the previous N speech segments.

It may be appreciated that generally there is no language whose score reaches the designated threshold, or there is only one language whose score reaches the designated threshold, and there are not more than two languages whose scores reach the designated threshold.

It may be appreciated that the score reaching the designated threshold means that the score is larger than or equal to the designated value.

Furthermore, after the language matched with the speech signal is obtained, the language matched with the speech signal is considered as a language recognition result, and the language recognition result is output to a control module. The control module judges whether a decoder currently used is a decoder corresponding to the language. If yes, the currently-used decoder may be used to perform speech recognition for already-received all speech segments; if not, switch to the decoder corresponding to the language, and use the decoder corresponding to the language to perform speech recognition for already-received all speech segments. As such, even though the server has not yet obtained a complete speech signal, the server may begin to perform language recognition and speech recognition, thereby improving the language recognition efficiency and the speech recognition efficiency.

In the prior art, after receiving all speech segments belonging to the same speech signal, the server considers the complete speech signal as a whole for mute detection, speech feature extraction and uses the language recognition model for recognition. A drawback of this technical solution is beginning the language recognition after receiving all speech segments, so the language recognition efficiency is lower so that the language recognition technique cannot be applied to an application scenario that needs to obtain a recognition result in time. For example, after a certain searching client in an unknown country receives the user-input speech signal, the server needs to receive a complete speech signal from the client, then wait for completion of the language recognition, then select a corresponding decoder according to the language recognition result to perform speech recognition, and finally perform search according to the speech recognition result and return a search result to the client. This series of processing procedures exhibit a lower efficiency, and the user feels a large feeling of delay. At present, an overall real time rate is about 0.5, that is to say, after finishing input of a speech signal of 3s long, the user needs to wait for 1.5 s to obtain the returned result.

To address the problem in the prior art, in the technical solution according to an embodiment of the present disclosure, language recognition is performed one time once a speech segment is received; if a matched language can be determined according to the score in the language recognition, the language recognition result is obtained immediately, language recognition needn't be performed any longer for the speech segments received thereafter, and speech recognition is started immediately, thereby improving the language recognition efficiency and speech recognition efficiency so that the user can obtain the desired result in time.

Due to limitation of speech integrity, a conventional language recognition technology is unlikely to combine with other speech technologies such as speech recognition, and cannot be applied to conventional speech-related application scenarios such as speech search and speech input. The technical solution according to an embodiment of the present disclosure can expand application scenarios of language recognition so that language recognition technology can be adapted for more application scenarios, for example an application scenario wherein a recognition result needs to be obtained.

In addition, in the prior art, an application enabling speech recognition usually can only receive a speech signal for a certain language. If the user needs to use other languages to input the speech signal, he can only select and use other applications, operation costs are higher and the user's experience is undesirable. However, if the language recognition method according to the embodiment of the present disclosure is used, it may enable speech signals input in different languages, reduce the operation costs and bring about excellent experience to the user.

Embodiments of the present disclosure further provide an apparatus for implementing the steps and method in the above method embodiments.

Figure 4:
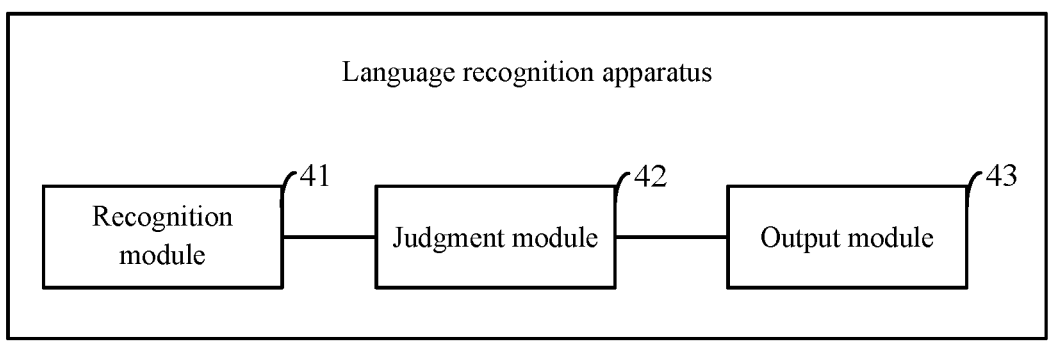
FIG. 4 is a block diagram of a language recognition apparatus according to an embodiment of the present disclosure.

Referring to FIG. 4, it is a block diagram of a language recognition apparatus according to an embodiment of the present disclosure. As shown in the figure, the apparatus comprises:

a recognition module 41 configured to, after receiving the $N^{th}$ speech segment included by a speech signal, perform language recognition according to previous N speech segments that have already been received, to obtain a score of each language in at least one language, N being 2, 3, 4, . . . ;

a judgment module 42 configured to, if there exists a language whose score reaches a designated threshold, consider the language whose score reaches the designated threshold as a language matched with the speech signal.

Optionally, the recognition module 41 is further configured to:

if there does not exist the language whose score reaches the designated threshold, after receiving the $N+1^{th}$ speech segment, continue to perform language recognition according to the already-received $N+1^{th}$ speech segment, until a language matched with the speech signal is obtained.

In a specific implementation procedure, the recognition module 41 is specifically configured to:

extract a speech feature from the $N^{th}$ speech segment;

obtain a statistics of the $N^{th}$ speech segment according to the speech feature;

obtain a second accumulated statistics according to the statistics of the $N^{th}$ speech segment and a first accumulated statistics of the previous N−1 speech segments;

use a language recognition model to perform language recognition for the second accumulated statistics to obtain a score of each language in at least one language.

Optionally, the recognition module 41 is further configured to:

perform mute detection for the $N^{th}$ speech segment to remove a mute signal from the $N^{th}$ speech segment.

In a specific implementation procedure, the second accumulated statistics comprises: weights of the speech features of previous N speech segments, an average value of speech features of the previous N speech segments, and a variance of the speech features of the previous N speech segments.

In a specific implementation procedure, the language recognition model comprises a judgment model and a background model; the recognition module, upon using the language recognition model to perform language recognition for the second accumulated statistics to obtain a score of each language in at least one language, is specifically configured to:

use the background model to convert the second accumulated statistics into a corresponding Gaussian hyper vector;

calculate a space distance between the vector in the judgment model and the Gaussian hyper vector as a score of the language corresponding to the judgment model.

Optionally, the judgment module 42 is further configured to:

if there still does not exist a language whose score reaches the designated threshold after all speech segments included by the speech signal are received, consider a language with the highest score as the language matched with the speech signal.

Optionally, the apparatus further comprises:

an output module 43 configured to consider the language matched with the speech signal as a language recognition result, and output the language recognition result.

Since units in the present embodiment can execute the method as shown in FIG. 2, reference may be made to relevant depictions of FIG. 2 for portions not detailed in the present embodiment.

Technical solutions of embodiments of the present disclosure have the following advantageous effects:

In the embodiment of the present disclosure, after the $N^{th}$ speech segment included by the speech signal is received, language recognition is performed according to already-received previous N speech segments to obtain the score of each language in at least one language, N being 2, 3, 4 . . . ; therefore, if there exists a langue whose score reaches the designated threshold, the language whose score reaches the designated threshold is considered as the language matched with the speech signal.

In the technical solution according to an embodiment of the present disclosure, language recognition can be performed once a speech segment is received, so that language recognition may be completed before all speech segments have been received. As compared with the method of beginning to perform language recognition after all speech segments must be received in the prior art, the embodiments of the present disclosure solve the problem in the prior art that the efficiency of language recognition is lower so that the language recognition cannot be applied to an application scenario in which the recognition result needs to be obtained quickly, and substantially improve the language recognition efficiency so that the language recognition can be applied to the application scenario in which the recognition result needs to be obtained quickly.

Those skilled in the art can clearly understand that for purpose of convenience and brevity of depictions, reference may be made to corresponding procedures in the aforesaid method embodiments for specific operation procedures of the system, apparatus and units described above, which will not be detailed any more.

In the embodiments provided by the present disclosure, it should be understood that the revealed system, apparatus and method can be implemented through other ways. For example, the above-described embodiments for the apparatus are only exemplary, e.g., the division of the units is merely logical one, and, in reality, they can be divided in other ways upon implementation. For example, a plurality of units or components may be combined or integrated into another system, or some features may be neglected or not executed. In addition, mutual coupling or direct coupling or communicative connection as displayed or discussed may be indirect coupling or communicative connection performed via some interfaces, means or units and may be electrical, mechanical or in other forms.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, read-only memory (ROM), a random access memory (RAM), magnetic disk, or an optical disk.

What are stated above are only preferred embodiments of the present invention, not intended to limit the invention. Any modifications, equivalent replacements, improvements and the like made within the spirit and principles of the present invention, should all be included in the present invention within the scope of protection.

What is claimed is:

1. A language recognition method, wherein the method comprises:

after receiving the Nth speech segment included by a speech signal, performing language recognition according to previous N speech segments that have already been received, to obtain a score of each language in at least one language, N being 2, 3, 4, . . . ; and if there exists a language whose score reaches a designated threshold, considering the language whose score reaches the designated threshold as a language matched with the speech signal, wherein the performing language recognition according to previous N speech segments that have already been received, to obtain the score of each language in at least one language comprises:

extracting a speech feature from the Nth speech segment;

obtaining a statistics of the Nth speech segment according to the speech feature;

obtaining a second accumulated statistics according to the statistics of the Nth speech segment and a first accumulated statistics of the previous N−1 speech segments; and using a language recognition model to perform language recognition for the second accumulated statistics to obtain the score of each language in at least one language.

2. The method according to claim 1, wherein the method further comprises:

if there does not exist the language whose score reaches the designated threshold, after receiving the N+1th speech segment, continuing to perform language recognition according to the already-received N+1th speech segment, until a language matched with the speech signal is obtained.

3. The method according to claim 1, wherein before extracting a speech feature from the Nth speech segment, the method further comprises: performing mute detection for the Nth speech segment to remove a mute signal from the Nth speech segment.

4. The method according to claim 1, wherein the second accumulated statistics comprises: weights of the speech features of previous N speech segments, an average value of speech features of the previous N speech segments, and a variance of the speech features of the previous N speech segments.

5. The method according to claim 1, wherein the language recognition model comprises a judgment model and a background model; the using the language recognition model to perform language recognition for the second accumulated statistics to obtain the score of each language in at least one language comprises:
   using the background model to convert the second accumulated statistics into a corresponding Gaussian hyper vector; and
   calculating a space distance between a vector in the judgment model and the Gaussian hyper vector as a score of the language corresponding to the judgment model.

6. The method according to claim 1, wherein the method further comprises:
   if there still does not exist a language whose score reaches the designated threshold after all speech segments included by the speech signal are received, considering a language with the highest score as the language matched with the speech signal.

7. The method according to claim 1, wherein the method further comprises: considering the language matched with the speech signal as a language recognition result, and outputting the language recognition result.

8. A device, comprising
   one or more processor;
   a memory;
   one or more programs stored in the memory and configured to execute the following operations when executed by the one or more processors:
   after receiving the $N^{th}$ speech segment included by a speech signal, performing language recognition according to previous N speech segments that have already been received, to obtain a score of each language in at least one language, N being 2, 3, 4, . . . ; and
   if there exists a language whose score reaches a designated threshold, considering the language whose score reaches the designated threshold as a language matched with the speech signal,
   wherein the performing language recognition according to previous N speech segments that have already been received, to obtain the score of each language in at least one language comprises:
      extracting a speech feature from the Nth speech segment;
      obtaining a statistics of the Nth speech segment according to the speech feature;
      obtaining a second accumulated statistics according to the statistics of the Nth speech segment and a first accumulated statistics of the previous N−1 speech segments; and
      using a language recognition model to perform language recognition for the second accumulated statistics to obtain the score of each language in at least one language.

9. The device according to claim 8, wherein the operation further comprises:
   if there does not exist the language whose score reaches the designated threshold, after receiving the N+1th speech segment, continuing to perform language recognition according to the already-received N+1th speech segment, until a language matched with the speech signal is obtained.

10. The device according to claim 8, wherein before extracting a speech feature from the Nth speech segment, the operation further comprises: performing mute detection for the Nth speech segment to remove a mute signal from the Nth speech segment.

11. The device according to claim 8, wherein the second accumulated statistics comprises: weights of the speech features of previous N speech segments, an average value of speech features of the previous N speech segments, and a variance of the speech features of the previous N speech segments.

12. The device according to claim 8, wherein the language recognition model comprises a judgment model and a background model; the using the language recognition model to perform language recognition for the second accumulated statistics to obtain the score of each language in at least one language comprises:
   using the background model to convert the second accumulated statistics into a corresponding Gaussian hyper vector; and
   calculating a space distance between a vector in the judgment model and the Gaussian hyper vector as a score of the language corresponding to the judgment model.

13. The device according to claim 8, wherein the operation further comprises:
   if there still does not exist a language whose score reaches the designated threshold after all speech segments included by the speech signal are received, considering a language with the highest score as the language matched with the speech signal.

14. The device according to claim 8, wherein the operation further comprises: considering the language matched with the speech signal as a language recognition result, and outputting the language recognition result.

15. A computer storage medium which is encoded with a computer program, the program, when executed by one or more computers, enabling said one or more computers to execute the following operations:
   after receiving the $N^{th}$ speech segment included by a speech signal, performing language recognition according to previous N speech segments that have already been received, to obtain a score of each language in at least one language, N being 2, 3, 4, . . . ; and
   if there exists a language whose score reaches a designated threshold, considering the language whose score reaches the designated threshold as a language matched with the speech signal,
   wherein the performing language recognition according to previous N speech segments that have already been received, to obtain the score of each language in at least one language comprises:
      extracting a speech feature from the Nth speech segment;
      obtaining a statistics of the Nth speech segment according to the speech feature;

obtaining a second accumulated statistics according to the statistics of the Nth speech segment and a first accumulated statistics of the previous N−1 speech segments; and using a language recognition model to perform language recognition for the second accumulated statistics to obtain the score of each language in at least one language.

16. The computer storage medium according to claim 15, wherein the operation further comprises:

if there does not exist the language whose score reaches the designated threshold, after receiving the N+1th speech segment, continuing to perform language recognition according to the already-received N+1th speech segment, until a language matched with the speech signal is obtained.

17. The computer storage medium according to claim 15, wherein before extracting a speech feature from the Nth speech segment, the operation further comprises: performing mute detection for the Nth speech segment to remove a mute signal from the Nth speech segment.

18. The computer storage medium according to claim 15, wherein the second accumulated statistics comprises: weights of the speech features of previous N speech segments, an average value of speech features of the previous N speech segments, and a variance of the speech features of the previous N speech segments.

19. The computer storage medium according to claim 15, wherein the language recognition model comprises a judgment model and a background model; the using the language recognition model to perform language recognition for the second accumulated statistics to obtain the score of each language in at least one language comprises:

using the background model to convert the second accumulated statistics into a corresponding Gaussian hyper vector; and calculating a space distance between a vector in the judgment model and the Gaussian hyper vector as a score of the language corresponding to the judgment model.

20. The computer storage medium according to claim 15, wherein the operation further comprises:

if there still does not exist a language whose score reaches the designated threshold after all speech segments included by the speech signal are received, considering a language with the highest score as the language matched with the speech signal.

21. The computer storage medium according to claim 15, wherein the operation further comprises: considering the language matched with the speech signal as a language recognition result, and outputting the language recognition result.

* * * * *